United States Patent [19]
Hult et al.

[11] Patent Number: 6,079,489
[45] Date of Patent: Jun. 27, 2000

[54] CENTRIFUGAL BACKSPIN RETARDER AND DRIVEHEAD FOR USE THEREWITH

[75] Inventors: Vern Arthur Hult; Curtis Christopher Blundell, both of Calgary, Canada

[73] Assignee: Weatherford Holding U.S., Inc., Houston, Tex.

[21] Appl. No.: 09/076,188

[22] Filed: May 12, 1998

[51] Int. Cl.[7] .................................................. E21B 43/00
[52] U.S. Cl. ....................... 166/68.5; 166/78.1; 188/184
[58] Field of Search .................................. 166/68.5, 78.1, 166/75.11; 188/67, 74, 82.2, 82.77, 82.8, 134, 136, 166, 184, 187

[56] References Cited

U.S. PATENT DOCUMENTS

| | | | |
|---|---|---|---|
| 3,576,242 | 4/1971 | Mumma ................................ | 193/35 A |
| 4,216,848 | 8/1980 | Shimodaira . | |
| 4,275,609 | 6/1981 | DeLaney . | |
| 4,388,837 | 6/1983 | Bender . | |
| 4,493,613 | 1/1985 | Sommer . | |
| 4,531,617 | 7/1985 | Martin et al. ............................ | 187/373 |
| 4,601,640 | 7/1986 | Sommer . | |
| 4,797,075 | 1/1989 | Edwards et al. . | |
| 4,993,276 | 2/1991 | Edwards . | |
| 5,358,036 | 10/1994 | Mills . | |
| 5,370,179 | 12/1994 | Mills . | |
| 5,551,510 | 9/1996 | Mills . | |
| 5,749,416 | 5/1998 | Belcher .................................. | 166/68.5 |

FOREIGN PATENT DOCUMENTS

| | | |
|---|---|---|
| 2284642 | 6/1995 | United Kingdom . |
| 457475 | 11/1991 | WIPO . |
| 528638 | 2/1993 | WIPO . |

*Primary Examiner*—Eileen Dunn Lillis
*Assistant Examiner*—Sunil Singh
*Attorney, Agent, or Firm*—Hayes, Soloway, Hennessey, Grossman & Hage, P.C.

[57] ABSTRACT

A backspin retarder for a shaft comprises a brake mechanism including a stationary brake member and opposed brake members rotatable with the shaft and movable between braking position in which the movable brake members engage the stationary brake member and a non-braking position in which the movable brake members are removed from the stationary brake member and a brake control mechanism responsive to the direction of rotation of the shaft for disabling the brake mechanism when the shaft rotates in a forward direction and for enabling the brake mechanism when the shaft rotates in a reverse direction.

12 Claims, 11 Drawing Sheets

CENTRIFUGAL BACKSPIN RETARDER AND DRIVEHEAD FOR USE THEREWITH

The present invention relates in general to backspin retarders and more specifically, to backspin retarders used in oil well pumping application using progressing cavity pump drives.

BACKGROUND OF THE INVENTION

The importance of backspin retarders in pumps, particularly progressing cavity pump drives, is well known in the art. Backspin is a condition which occurs when a well head is being shut down or restarted. Progressing cavity pumps are located at the bottom of an oil well bore, which in some cases, may be several thousand feet deep. Thus, pumping oil to the surface requires very high pressure. In addition, the pump drive rods, called sucker rods, may be wound torsionally several dozen times. When the pump is stopped, the combination of the very high pressures or head above the pump and sucker rod wind-up cause the pump and drive mechanism to rotate in reverse. If not controlled, the drive can rotate at speeds high enough to cause drive sheaves and other components mounted in the top drive to fly apart and cause serious injury to service personnel at the surface.

Thus, backspin retarders have been developed to control backspin until the fluid head and sucker rod wind-up have been reduced to safe levels. Existing backspin retarders have met with varying degrees of success. Typical prior art of retarders use built-in pumps to discharge fluid through an orifice and cause increased braking as speed increases. Some retarders have been placed on drive motor shafts. However, if a drive belt breaks, backspin protection is lost completely. Generally, prior art retarders have not been as reliable and durable as is desired considering safety issues.

SUMMARY OF THE INVENTION

The present invention seeks to provide a backspin retarder which will permit substantially unrestricted backward and forward rotation of the drive train up to a predetermined to speed without any braking and which provides braking effort related to the reverse speed of the drive train. The invention provides a number of side benefits because it allows a faster and more complete fluid dump through the downhole pump than is available with prior art retarders. A more complete fluid dump means that there is less danger of a problem on restart because the drive does not start against a fluid head and, thus, restart is easier.

The present invention is briefly defined as a backspin retarder for a shaft, comprising a brake mechanism including a stationary brake member and opposed brake members rotatable with said shaft and movable between braking position in which said movable brake members engage said stationary brake member and a non-braking position in which said movable brake members are removed from said stationary brake member and a brake control mechanism responsive to the direction of rotation of said shaft for disabling said brake mechanism when said shaft rotates in a forward direction and for enabling said brake mechanism when said shaft rotates in a reverse direction.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

Figure 1:
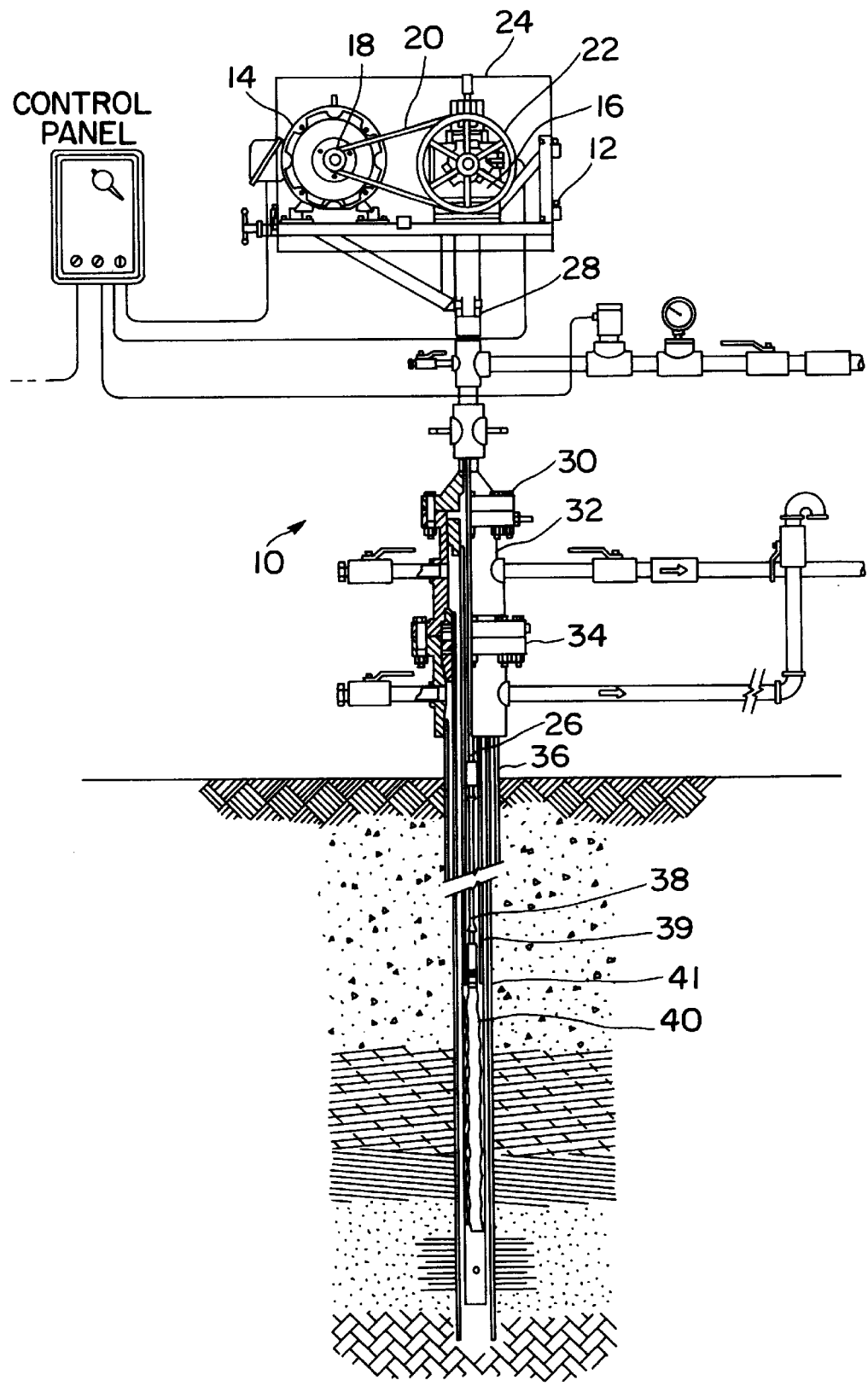
FIG. 1 is a partially sectioned, elevational view of typical drive and progressing cavity pump installation illustrating the environment in which the present invention is typically used.

By way of overview, FIG. 1 illustrates a drive and progressing cavity pump installation 10. The installation includes a motor mount 12 which supports an electric motor 14 connected to a Drive Head 16 by means of a drive sheave 18, drive belts 20 and a driven sheave 22. A belt guard 24 is supported about the drive belts and sheaves. The Drive Head supports a drive shaft 26, generally known in the art as a "polished rod", which extends downwardly and outwardly of the drive head, through a wellhead frame 28, a tubing head adapter 30, a tubing head 32, a casing head 34 and into a surface casing 36. The shaft is connected to the upper end of a string of sucker rods 38, the lowermost sucker rod being connected to a progressing cavity pump 40 which is connected to tubing 39, which, in turn, is mounted within a production casing 41. It is to be understood that the present invention is not limited to the specific motor mount and drive arrangement illustrated in FIG. 1.

The string of sucker rods may several thousand feet long and, thus, the string supports a very substantial head of oil. In addition, the string may be wound torsionally several dozen times. When the pump is stopped, the combination of the very high pressures or head above the pump and sucker rod wind-up may cause the pump and drive mechanism to rotate in reverse. If not controlled, the drive can rotate at speeds high enough to cause the drive sheaves and other components mounted in the top drive to fly apart, creating a very substantial hazard to service personnel. It is the function of the backspin retarder to control reverse rotation of the string and do so in such a manner that a substantially complete dump of the fluid in the string between the shaft and the tubing is achieved. The present invention provides an improved backspin retarder which has a number of advantages as will become apparent from the following description. The backspin retarder is mounted in the Drive Head so that, even if the electric motor drive belts break, the retarder will still be connected to the drive shaft and string and carry out the function it was designed to perform. Three centrifugally actuated backspin retarder embodiments will now be described. In the descriptions, like reference numerals have been used to designate like parts.

First Embodiment

Figure 2:
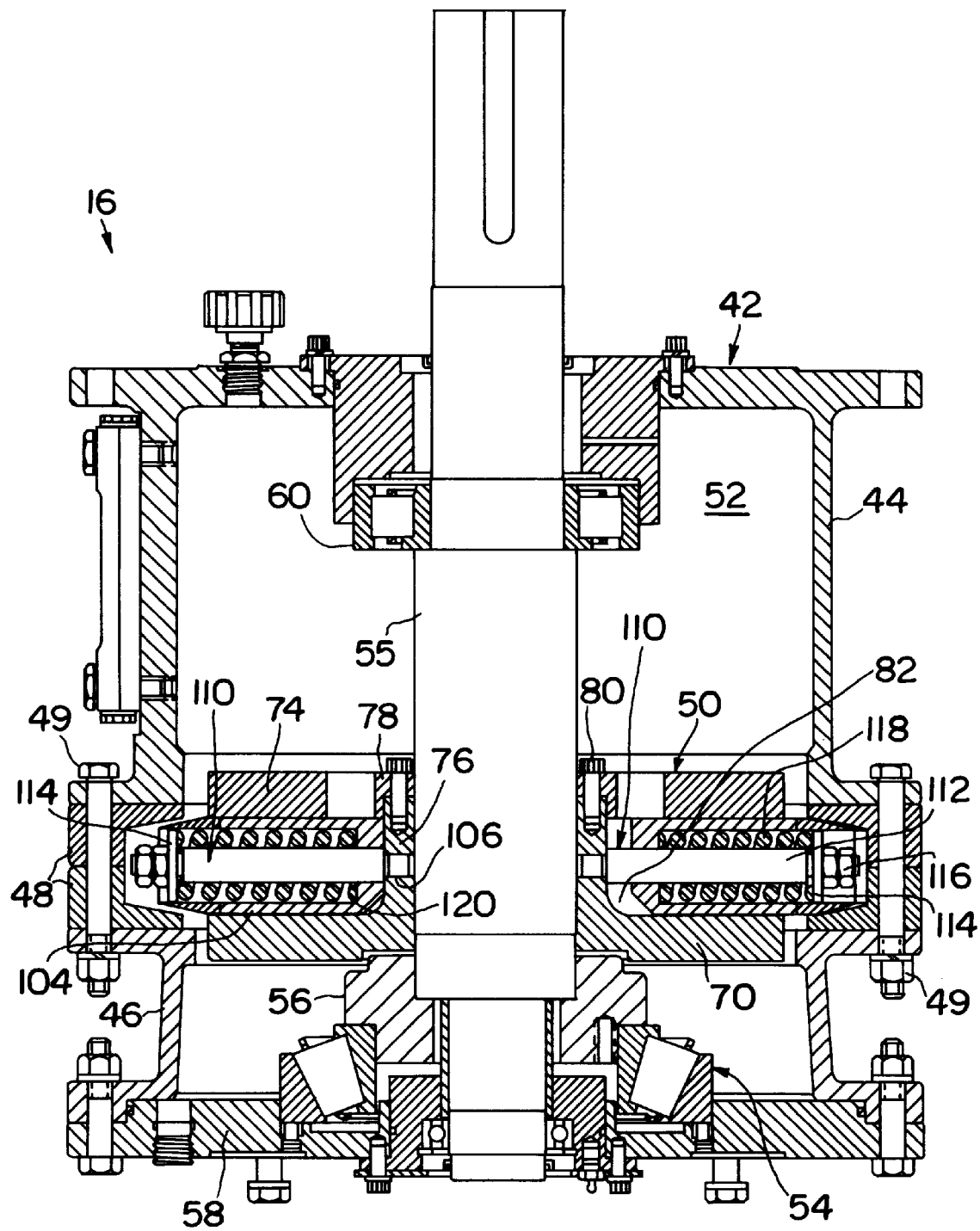
FIG. 2 is a longitudinal cross-section view of a drive assembly which houses a backspin retarder according one embodiment of the present invention.

FIG. 2 is a cross sectional view of the drivehead 16 according to a first embodiment of the present invention. Drivehead 16 comprises a housing 42 which includes a top housing 44, a bottom housing 46 and a pair of brake seating plates 48 sandwiched between and connected to the top and bottom housings, respectively, by bolts and nuts 49. The seating plates 48 form part of the backspin retarder 50, as explained later, and may, if desired, be formed integrally with the top and bottom housings. The housing defines a sealed fluid chamber 52. Bottom housing 46 provides a main thrust bearing 54 for rotatably supporting a Drive Head shaft 55 which, as with all embodiments of the present invention, is adapted to be drivingly secured to polished rod 26 in any suitable manner. For example, shaft 55 could be tubular for receiving the polished rod in a telescoping fashion and a clamp may be provided for connecting the two shafts. A bearing spacer 56 is seated on main thrust bearing 54. A bottom cover plate 58 sealingly closes the bottom end of bottom housing 46. Top housing 44 provides a radial load bearing 60 for rotatably supporting the upper end of shaft 55 in the housing.

The backspin retarder 50 is interposed between the top and bottom housings and defines a fluid flow path between the interior of the top and bottom housings as will be explained. The retarder includes a guide flange 70, four wedge shaped brake members 72, a keeper plate 74 and the aforementioned pair of seating plates 48.

Guide flange 70 includes a hub 76 which receives and is keyed to shaft 55 for rotation with the shaft. The keeper plate 74 is secured to the upper end 78 of the hub 76 by screws 80. The flange 70, hub 76, keeper plate 74 and seating plates 48 define a cavity 82 for the four brake members 72. It will be understood that the by those skilled in the art that more or less actuators may be provided without departing from the spirit of the invention.

The brake members are movable from a radially inner position, shown by the brake member on the left side of FIG. 2, to a radially outer position, shown by the brake member on the right side of FIG. 2. FIG. 2 shows the two brake members in different positions for illustration purposes only. In practice, the brake members are of identical construction and, therefore, move in unison. The inner position is the operating position of the brake members during normal pumping operations and during fluid dump operations when the reverse shaft speed is less than a predetermined threshold value. The actuators are moveable toward the outer positions by centrifugal force which exceeds the spring force of pre-loading springs 84 mounted within each brake member. This feature permits fast fluid dumps when the unit is shut down.

When the reverse rotational speed of the shaft exceeds a predetermined value, the actuators move outwardly and their outwardly tapered surfaces engage the inwardly tapered surfaces of the brake seating plate. The braking effort is proportional to the centrifugal force which, in turn, is proportional to the reverse shaft speed.

The retarder is submerged in a bath of oil which reduces wear, facilitates the heat transfer from the brake members to the fluid and then to the housing.

Figure 3:
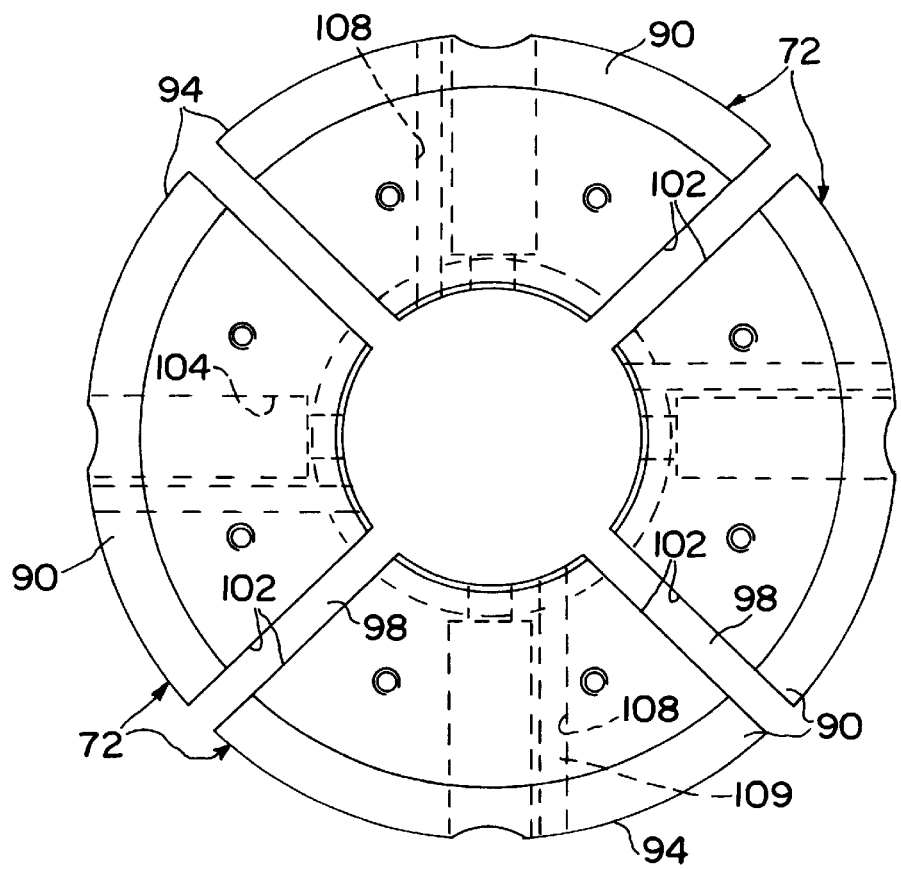
FIG. 3 is a top view of four brake wedge plates used in the backspin retarder illustrated in FIG. 2.
Figure 4:
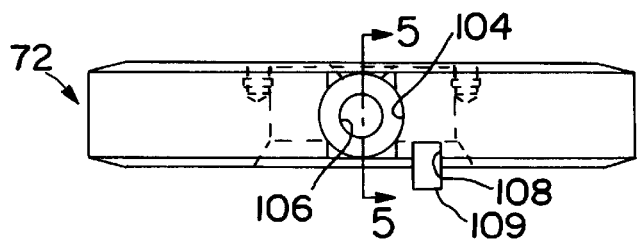
FIG. 4 is an end view of one of the wedge brake plates illustrated in FIG. 3.
Figure 5:
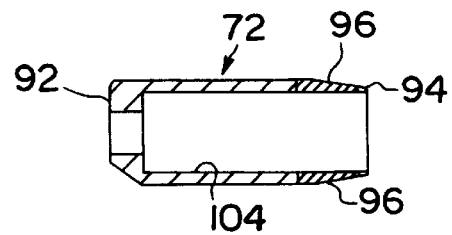
FIG. 5 is a longitudinal cross-sectional view taken along line 5—5 of FIG. 3.

FIGS. 3, 4 and 5 illustrate the four wedge brake members in more detail. The brake members or actuators are formed from a single cylindrical steel plate after a circumferential layer 90 of brake material has been applied to the outer circumference of the plate. The plate is bored to provide an inner diameter 92 corresponding to the diameter of shaft 55. The outer diameter 94 of the plate corresponds to the diameter of the braking portion of the seating plates described later. As best shown in FIG. 5, the outer edges of the plate are machined to provide an inward taper 96. Two slots 98 are cut through the plate along two diametrical orthogonal lines to form four identical wedge shaped pieces having a circular inner surface 92 and a pair of side surfaces 102. Thus, in the inner operating position of the wedge members, the circular surface 92 essentially abuts the surface of the shaft and adjacent radial surfaces 102 of adjacent wedge members abut one another. As the brake members move radially outwardly to the position shown in FIG. 3, the radial surfaces separate.

Each wedge member is formed with a radial, blind bore 104 extending inwardly from the circumference along a wedge bisecting axis for receiving a pre-loading spring assembly 110. A coaxial threaded hole 106 of reduced diameter is formed in the inner end of the blind bore for receiving the threaded end of a spring retaining pin 112. The actuators are also formed with a slot 108 which is parallel to the axis of the bore and opposed to a corresponding slot 111 formed in a mating surface of the guide flange for receiving a key (109). The key serves to both rotatably drive the actuator and guide it radially outwardly and inwardly.

As best shown in FIG. 2, a pre-loading spring assembly 110 is mounted into each wedge brake member and includes a spring retaining pin 112, having an inner threaded end threaded into hole 106 and an outer threaded end which receives a washer 114 and a pair of jam nuts 116, and a coil compression spring 118 mounted on the retaining pin in bore 104 between the shoulder 120 defined by bore 104 and washer 114.

The springs are pre-loaded so that the centrifugal forces generated during normal pumping operations are insufficient to overcome the spring force, so that, in turn, the wedge brake members are retained in their innermost positions. Preferably, the pre-loading is adjusted to permit a higher rotational speed before the centrifugal force begins to displace the wedge brake members but which will permit full displacement of the brake members once a predetermined maximum safe speed has been attained. This is to permit a fast fluid dump when the shaft is rotated in reverse. In the maximum displacement of the brake members, the brake surfaces of the brake members cooperate with the brake surfaces of the seating plates by shearing a thin layer of oil between the brake surfaces.

The centrifugal mechanism allows backward and forward rotation up to a predetermined speed without any braking. The pre-load springs allow threshold speed to be set above the normal forward speed. This means that no mechanism is required to engage the retarder in the reverse direction. Accordingly, the mechanism is inherently much safer since there is no mechanism to malfunction. Providing no retarding up to a high speed provides for a fast and more complete fluid dump through the downhole pump and it is easier to restart the pump since it is not necessary to start against a fluid head. It is safer for well service crews since fluids stored above the pump in the tubing causes a safety hazard during well servicing (unseating the rotor during well servicing reduces pump friction, allowing fluid to drive the rotor to very high speeds without retarder control because the drive clamp is not engaged with the drive head).

The centrifugal brake is also inherently safe in this application because the brake prevents high centrifugal forces which would destroy sheaves or motor fans and the brake acts directly as a result of centrifugal speed. Other mechanisms, such as pumps discharging through an orifice (typical prior art) do not act directly as a result of speed but, rather, they sense a discharge rate through the pumps and then cause braking by a second mechanism. If, for example, a prior art pump fails or runs out of oil, there is no braking. The present invention is always subject to centrifugal force and is prevented from acting by a spring pre-load until the speed reaches a preset threshold. Although the mechanism normally operates in oil, oil is not required to achieve braking so that the brake operates even if the drive loses all of its oil.

Figure 6:
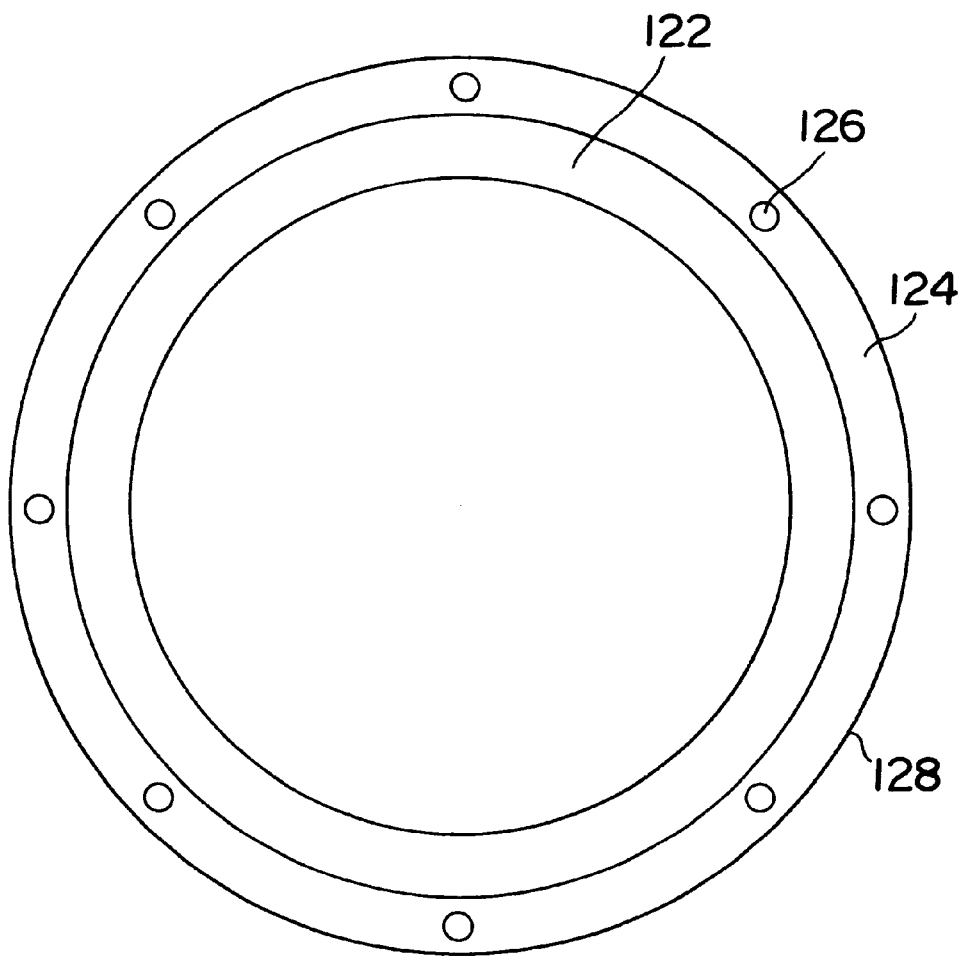
FIGS. 6 and 7 are respectively top and cross-sectional views of one of two wedge brake seating plates used in the backspin retarder illustrated in FIG. 2.
Figure 7:
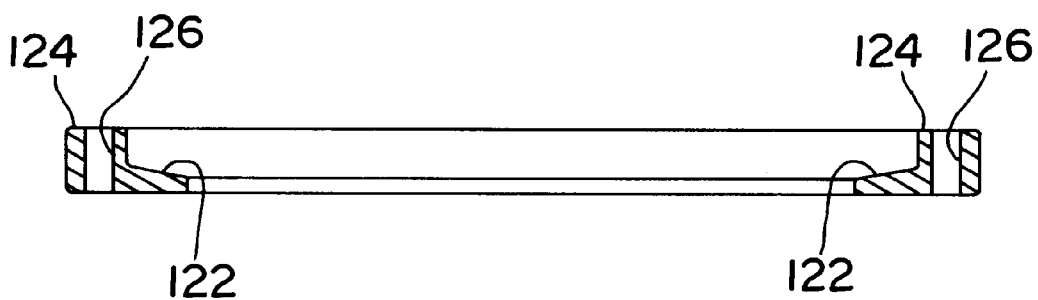

FIGS. 6 and 7 illustrate one of the two wedge brake seating plates 48. Seating plates 48 provide tapered braking surfaces 122 which mate with the tapered braking surfaces of the wedge brake members and serve to transfer braking loads to the housing. The seating plates abut one another along abutting surfaces 124, are provided with a peripheral holes 126 for receiving mounting bolts and a large inner diameter 128 to permit fluid flow between the top and bottom housings.

Figure 8:
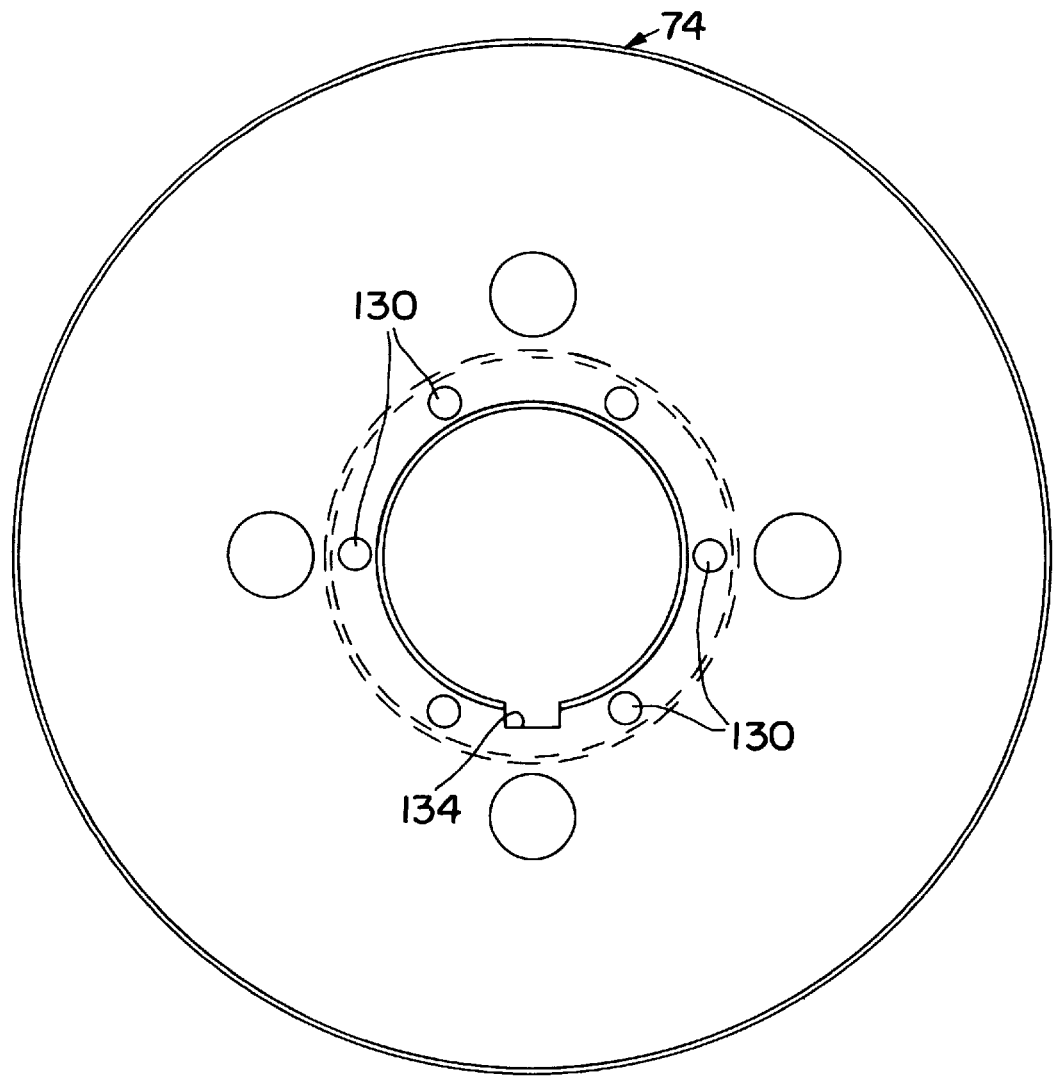
FIGS. 8 and 9 are respectively top and cross-sectional views of keeper plate used in the backspin retarder illustrated in FIG. 2.
Figure 9:
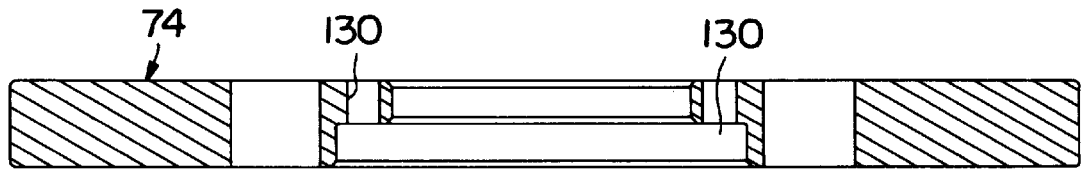
Figure 10:
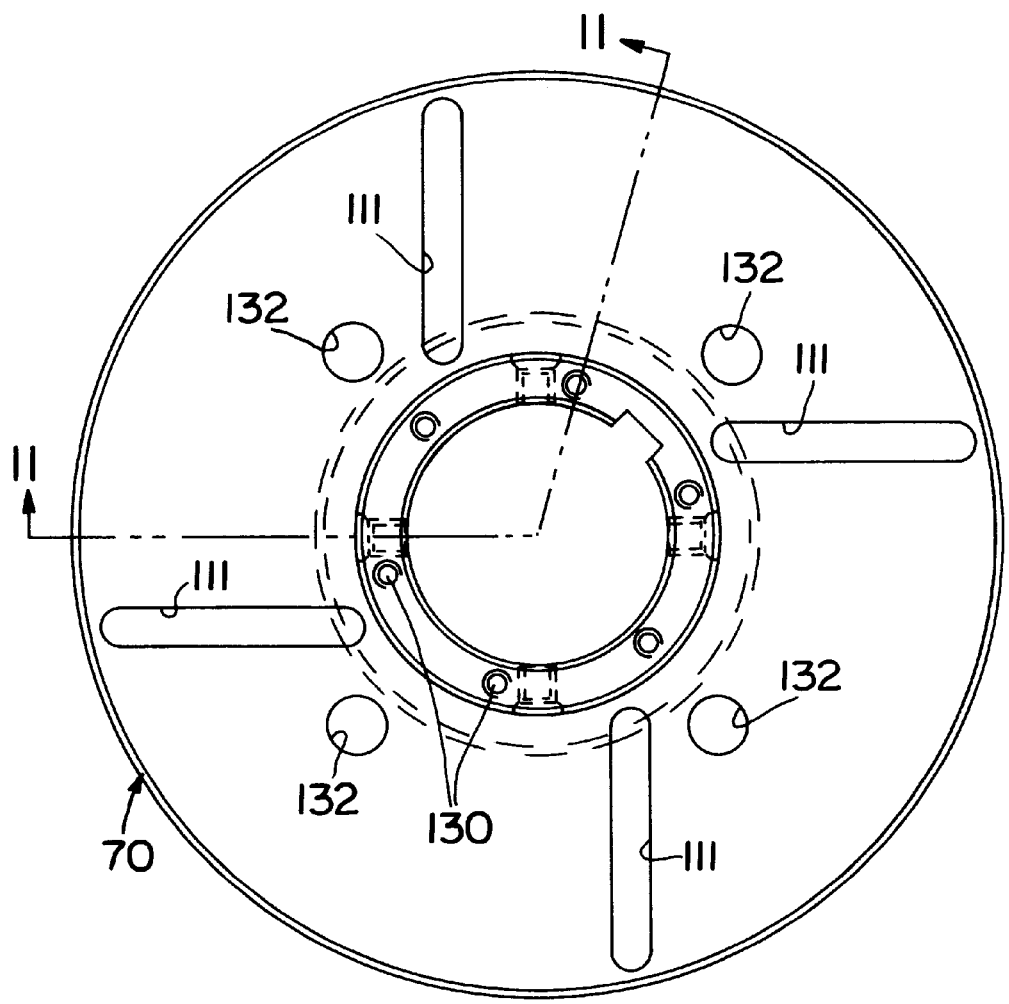
FIGS. 10 and 11 are respectively top and cross-sectional views of a wedge brake guide used in the backspin retarder illustrated in FIG. 2.
Figure 11:
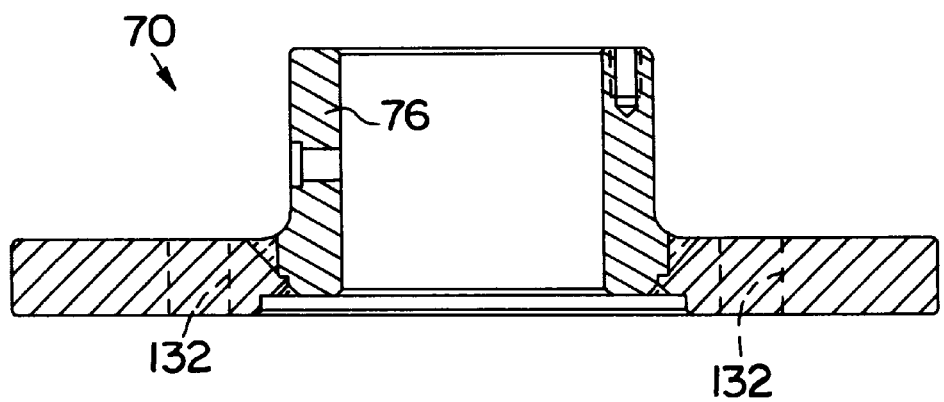

The guide plate, shown in FIGS. 10 and 11, and the keeper plate, shown in FIGS. 8 and 9, are provided with aligned holes 130 to receive capscrews 80 and keyways 134 for receiving a key (not shown) for rotatably connecting the plates to the shaft. Thus, the two plates operate in unison to retain the wedge brake members axially in their operative positions, providing sufficient clearance to permit the wedge brake members to operate freely. As previously mentioned, the upper surface of the guide plate is formed with slots for receiving a key for rotatably, drivingly connecting the wedge brake members to the guide plate. The axis of the slots is parallel to the axis of bore 104, which extends radially from the axis of the shaft. In addition, the guide plate is formed with four equally spaced holes 132 which define fluid passages through the guide plate. These holes are positioned so that they are covered when the wedge brake members are in their innermost positions, but which are progressively opened as the brake members move towards their outermost, braking position, thus providing oil flow to cool the braking mechanism.

Second Embodiment

Figure 12:
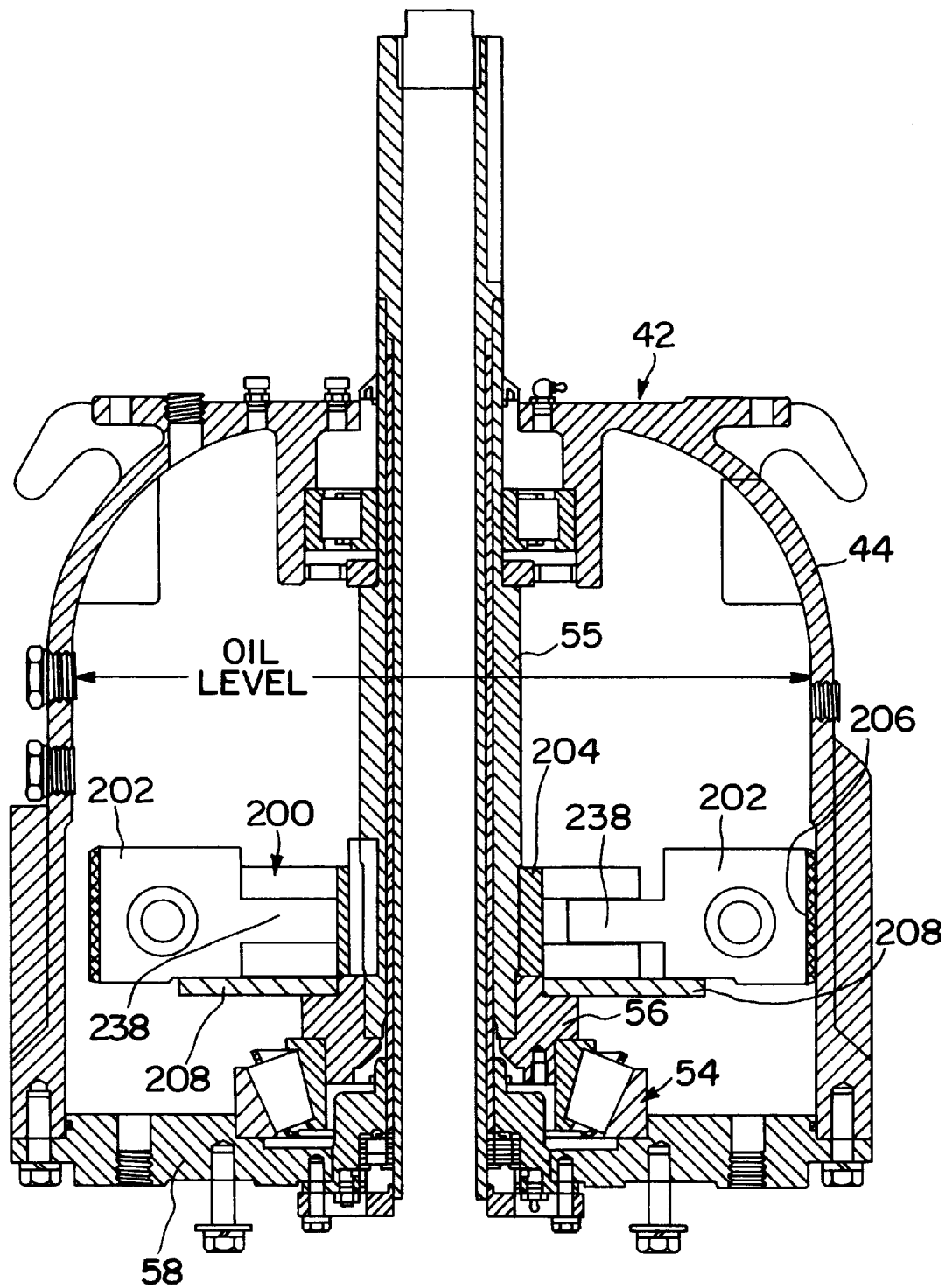
FIG. 12 is a longitudinal cross-sectional view similar to FIG. 2, but illustrating backspin retarder according second embodiment of the present invention.
Figure 13:
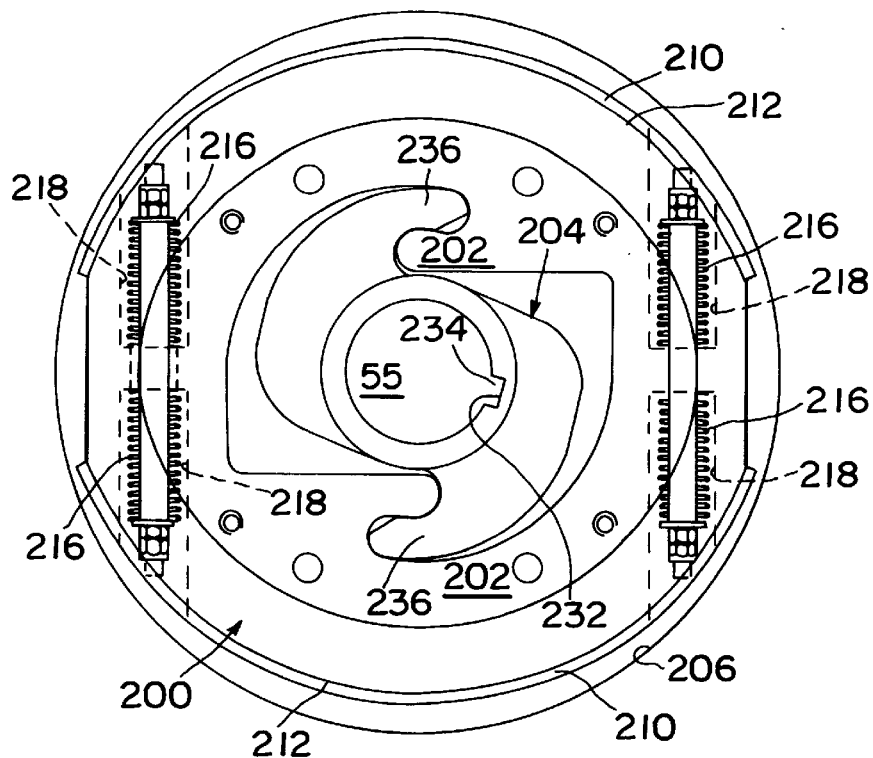
FIG. 13 is a cross-sectional view taken along line 13—13 of FIG. 12 and illustrating the retarder in an inactive or disabled position.
Figure 14:
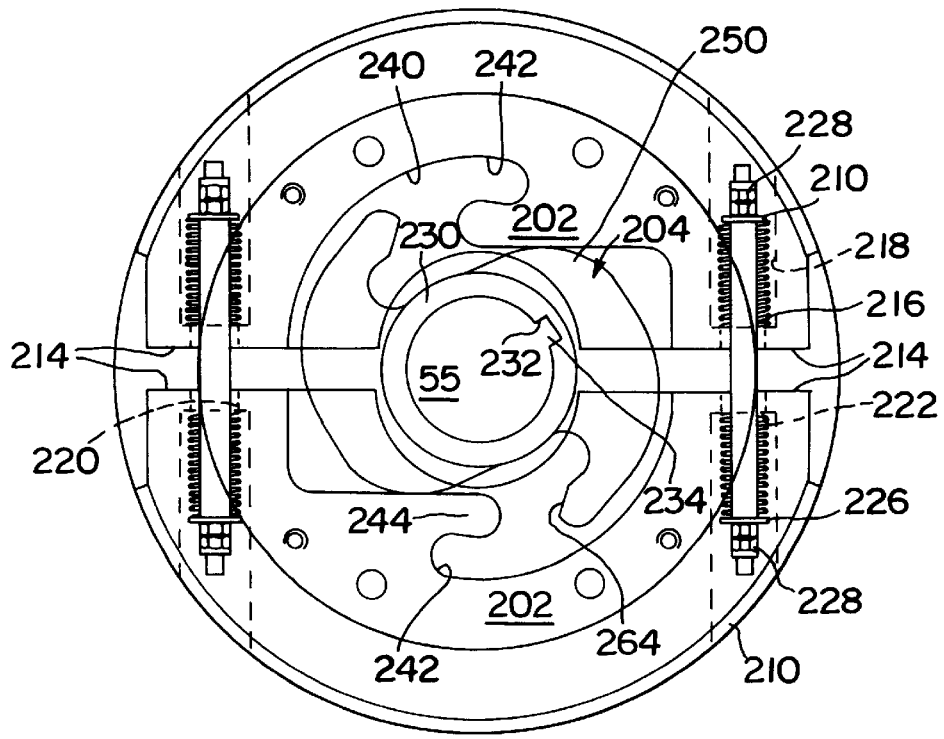
FIG. 14 is a cross-sectional view taken along line 13—13 of FIG. 12 and illustrating the retarder in an active or braking position.

In a second embodiment of the invention, illustrated in FIGS. 12–14, the centrifugal brake mechanism acts directly on the housing 42. This embodiment provides backspin retarder 200 having two or more weighted movable brake members which are biased toward an inner inactive or disabled position, and which, during forward rotation of the drive shaft, are retained in the inner position and which, during reverse rotation of the drive shaft, are permitted to move radially outwardly under the influence of centrifugal force towards and in engagement with housing 42, which serves as a stationary brake member. In addition, during reverse rotation, means is provided for urging the movable brake members into more intimate contact with the stationary brake member.

Referring to FIGS. 12–14, retarder 200 will be seen to be comprised of a pair of opposed, movable brake members or brake shoes 202, a brake actuator, generally designated by reference numeral 204, and a stationary brake member 206, which in this embodiment, is the inner surface of the housing 42. The brake members are axially supported by an annular support plate 208 mounted on bearing spacer 56. The support plate is preferably made of a bearing material to prevent galling of the brake shoes and serves as a rotatable bearing for the bearing spacer. The function of the shoe support plate is to support the shoes such that they do not vertically rest on the brake actuator so that, in turn, the inertia of the shoes will tend to hold the shoes in position while the actuator rotates from the forward, disengaged direction to the reverse, engaged direction, as will become clearer as the description proceeds.

As best seen in FIGS. 12 and 13, brake shoes 202 are generally semi-circular in shape and having a brake lining 210 affixed to their respective outer circular faces 212 for engagement with the inner surface of the housing. The brake shoes are radially movable with respect to the axis of shaft 55 between an inner, retracted position shown in FIG. 13 and an outer braking position shown in FIG. 14. The generally planar, inner edges 214 of the brakes shoes abut one another in the retracted position to limit the degree of travel, balance the shoes during forward rotation and reduce oil-circulation in this non-braking position.

The brake shoes are biased towards the inner, retracted position by compression springs 216. To that end, each brake shoe is formed with holes 218 which open into inner edges 214 and which parallel the direction of movement of the brake shoes. The holes include a reduced diameter portion 220 defining an annular shoulder 222. The holes are aligned as shown to receive a spring retaining rod 224. The springs are telescopically mounted on the opposite ends of the rod with their inner ends bearing against shoulder 222 and their outer ends bearing against a washer 226 and jam nuts 228. In the absence of centrifugal force sufficient to overcome the force of the springs, the springs will urge the brake shoes towards their inner, retracted positions shown in FIG. 13.

Brake actuator 204 has two primary roles. The first is to positively retain the brake shoes in their retracted positions during forward rotation of the drive shaft which, in FIGS. 13 and 14, is in the clockwise direction. The second role of the actuator is to urge the brake shoes into more intimate contact with the stationary brake member during reverse rotation of the shaft by applying an additional radial outward force against the brake shoes. The actuator is formed with a cylindrical hub 230 having a keyway 232 for receiving a key 234 formed in the shaft. Thus, the actuator rotates with the shaft. The actuator is further formed with a pair of opposed, latching fingers 236, one finger associated with each brake shoe. The latching fingers are bifurcated to receive a portion 238 of reduced thickness of the brake shoes which define latching finger receiving recesses 240 on opposite sides of the brake shoes. Each recess defines a cavity 242 and projection 244, the cavity for receiving the end of a latching finger for interlocking the actuator and brake shoes. In addition, the latching fingers are each formed with a cam surface 250 on the side thereof remote from the axis of the shaft. When the shaft is rotated in a counterclockwise direction, the cam surfaces 50 act upon planar surfaces 252 of the brake shoes and thereby urges the brake shoes radially apart towards and into engagement with the stationary brake member. Finally, the underside of the tips of the latching fingers are formed with a chamfer 254 which engage the tips of projections 244 and guide the tips of the fingers into cavities 242 when the shaft is restarted in a forward direction while the still rotating in reverse so as to ensure that an interlock is achieved.

In operation, when the shaft is rotated in a forward direction, the tips of the latching fingers enter cavities 242 and thereby not only prevent reverse rotation of the brake shoes, but retain the shoes in their radially inner, disabled positions and cause the shoes to rotate with the actuator and the shaft. If, for any reason, the shaft is caused to rotate in reverse, the actuator will rotate in a counterclockwise direction with respect to the brake shoes and disengage the shoes. This will free the brake shoes to move radially outwardly under centrifugal force towards and into engagement with the stationary brake surface. Further, the cam surfaces with apply a radial outward force to surfaces 252 of the brake shoes in addition to the centrifugal force.

The above described cam assisted operation means that the centrifugal brake shoes can be about 50% lighter than brake shoes which rely entirely on centrifugal force as is typical in the prior art. The cams press radially outward while applying tangential (torque) loading to the shoes. The radial component of the cam force puts more pressure on the brake shoes and thereby provides more torque than a device which depends only on centrifugal force.

It is important to note that the brake retarder provides a brake disengagement mechanism, rather than a brake engagement mechanism, so that the brake is deactivated while operating in the forward direction. This means there is no brake engaging device which could fail to engage and, thus, the brake reliability is enhanced. The brake is activated automatically as soon as the shaft begins to rotate in reverse, subject only to the spring force of the springs. As with the previous embodiment, the springs will resist braking until a predetermined safe shaft speed.

Third Embodiment

Figure 15:
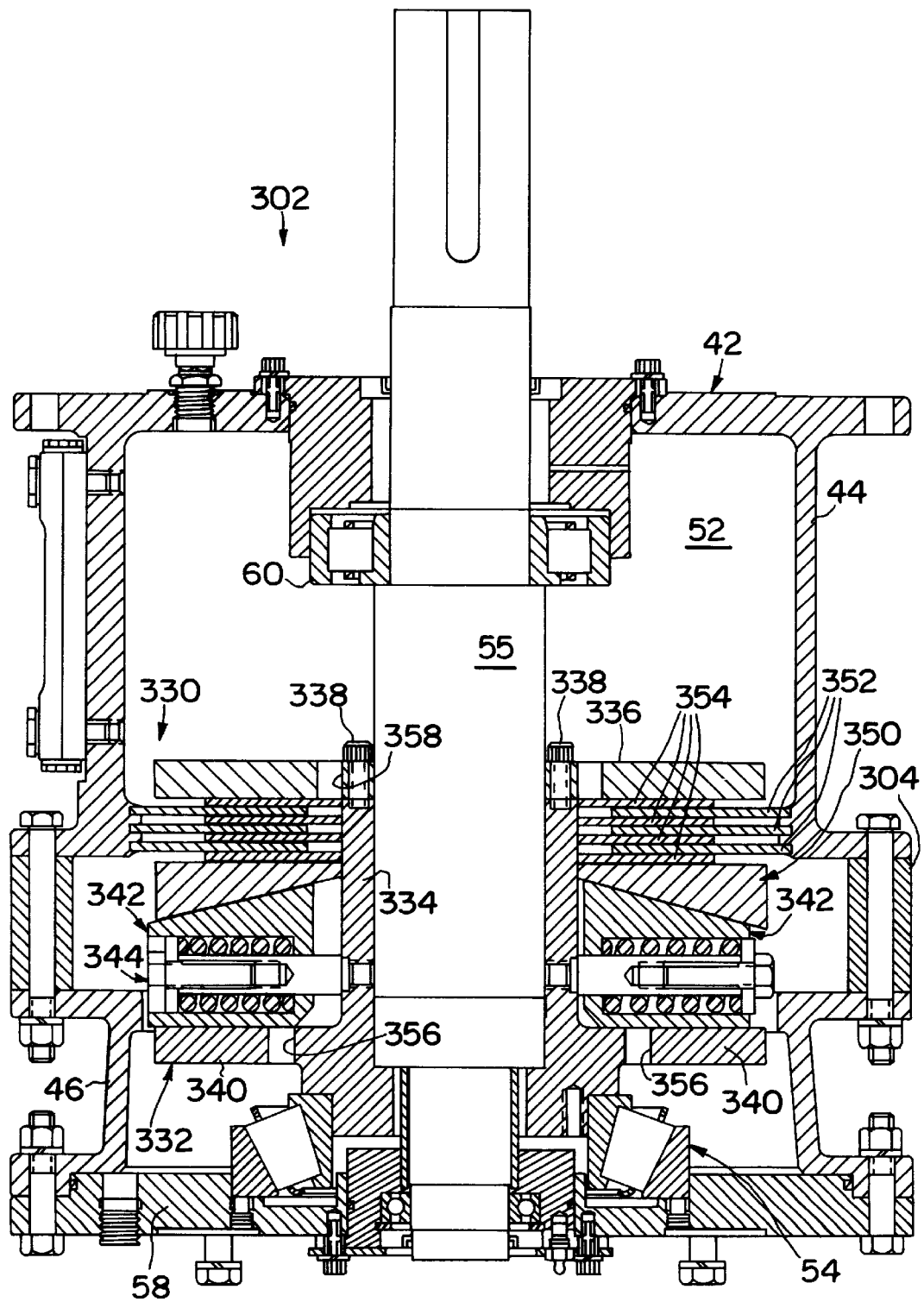
FIG. 15 is a longitudinal cross-sectional view similar to FIG. 2, but illustrating backspin retarder according to a third embodiment of the present invention.

FIG. 15 is a cross sectional view of the drivehead 302 according to a third embodiment 300 of the present invention. Drivehead 302 comprises a housing 42 which includes a top housing 44, a bottom housing 46 and a spacer 304 sandwiched between and connected to the top and bottom housings, respectively, by bolts and nuts 49. It will be understood that the top and bottom housings and the spacer may be formed as a single integral unit if desired. The housing defines a sealed fluid chamber 52. Bottom plate 58 provides a main thrust bearing 54 for rotatably supporting shaft 55 and sealingly closes the bottom end of the housing. Top housing 44 provides a radial load bearing 60 for rotatably supporting the upper end of shaft 55 in the housing. A backspin retarder 330 is mounted in the housing as will now be described.

Backspin retarder 330 is similar to that of the first described embodiment except that braking is achieved by interaction between a plurality of stationary and rotating disks caused by a centrifugal brake actuator to gain more braking than could be achieved by a single friction interface while retaining the wedging action to multiply brake pressure in response to centrifugal force on the actuators.

Figure 16:
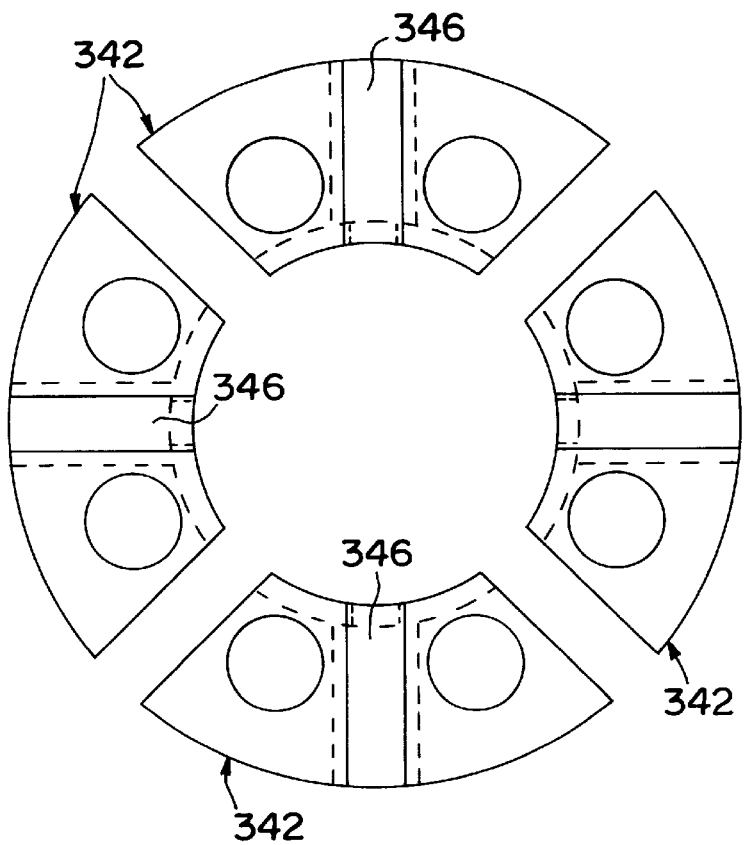
FIG. 16 is a top view of four centrifugal brake actuator members used in the backspin retarder embodiment of FIG. 15.
Figure 17:
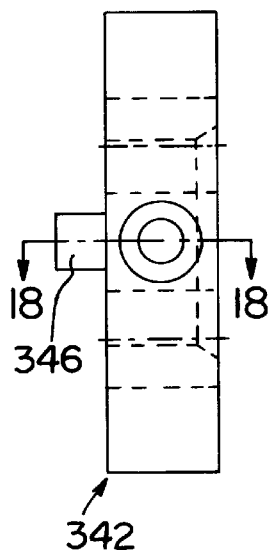
FIG. 17 is an elevational view of one of the brake actuator members shown in FIG. 16.
Figure 18:
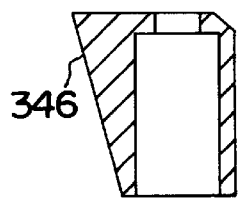
FIG. 18 is a cross-sectional view taken along line 18—18 of FIG. 17.
Figure 19:
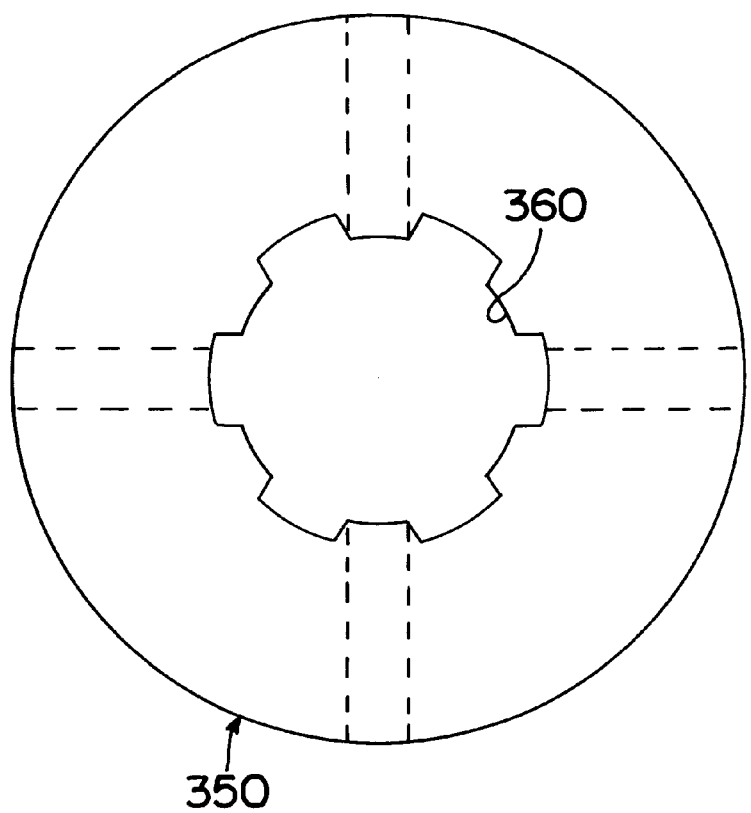
FIGS. 19 and 20 are plan and cross-sectional views, respectively, of a brake actuator pressure plate which cooperates with the brake actuator members to apply braking effort to the brake mechanism.
Figure 20:
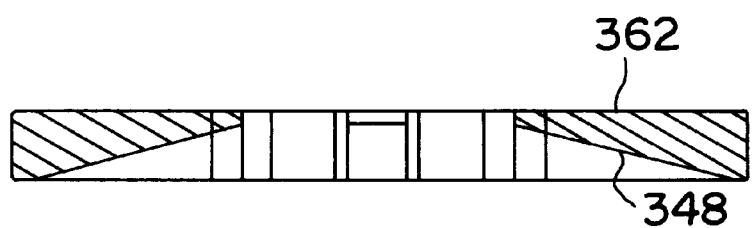

The backspin retarder includes a carrier 332 having a hub 334 mounted on the shaft for rotation therewith. The hub is seated on the main thrust bearing and axially supports the shaft as shown. A keeper plate 336 is secured to the upper end of the hub by capscrews 338. Thus, the carrier and keeper plate rotate together with the shaft. An annular carrier plate 340 extends radially outwardly of the hub for axially supporting four (more or less is permissible) centrifugal brake actuators 342 which are illustrated in more detail in FIGS. 16–18. Actuators 342 are confined for rotation with a pressure plate 350 and are permitted to move radially outwardly under an appropriate centrifugal force to a radially outer position shown on the left hand side of FIG. 15, which is a brake engaging position. Pre-load spring assembly 344, similar to that shown in FIG. 2, mounted in the actuators biases the actuators toward an inner radial position shown on the right hand side of FIG. 15. The spring pre-load is set such that the actuators do not begin to move radially outwardly until the shaft has reached a predetermined speed which is above the normal forward operating rotational speed of the shaft. Each actuator is formed with a planar, radially extending wedge surface 346 for engagement with a mating wedge surface 348 formed on pressure plate 350 which is concentrically mounted on the hub as shown. The pressure plate is best illustrated in FIGS. 19 and 20. Pressure plate 350 includes a splined bore 360 which engages a mating spline on the hub for rotation of the pressure plate with the hub and shaft. A flat, annular surface 362 on the side of the plate opposite the wedge surfaces 348 is provided for abutting engagement with the lowermost one of a plurality of rotatable brake disks described below. It will be seen from FIG. 15 that radial outward movement of the actuators results in the application of an axially upward force to pressure plate, causing to plate to move upwardly. Due to the wedging effect, the upward force exceeds the radial force caused by centrifugal action and, thus, provides more braking effect. The pressure plate is allowed to travel axially on the actuator by sliding freely on the mating splines while transmitting torque.

A plurality of axially spaced-apart, stationary annular brake disks 352 are secured to and extend inwardly from the inner surface of the top housing between the keeper plate and the pressure plate as shown. A plurality of axially spaced-apart, movable annular brake disks 354 are secured to the hub and extend outwardly from the inner surface of the hub in an alternating fashion between the stationary brake disks 352. In the absence of an axial upward force applied by the actuators, the rotatable disks are free to rotate between the stationary disks. However, when the actuators move radially outwardly, the pressure plate is urged axially upwardly and compresses the sandwich of rotatable and stationary disks into frictional engagement. Braking is achieved by shearing a thin film of oil between the rotatable and stationary disks.

The carrier plate is formed with four equally angularly spaced holes 356 which are covered by the actuators in their inner positions and uncovered as the actuators move outwardly. This defines a fluid passageway extending from the oil chamber in the bottom housing, through the retarder chamber and into the disk chamber. Similarly, the keeper plate is formed with a plurality of axial holes 358 to provide fluid flow between the disk chamber and the oil chamber in the top housing. Oil is also permitted to flow between the ends of the keeper plate and carrier plate. The holes allow oil to circulate, due to centrifugal pumping, to cool and lubricate the friction surfaces. Increased oil flow is provided during braking to cool the friction surfaces and carry the hot oil to the main housing.

We claim:

1. A backspin retarder assembly for a well head drive assembly, comprising:

means defining a backspin chamber in a pump drive housing rotatably mounting a drive shaft;

brake members disposed within said backspin chamber in equally, angularly spaced relation, said members being movable between inner and outer positions and being biased toward said inner positions, each said brake member having brake surfaces on opposite sides thereof;

means defining stationary brake surfaces in said drive housing and engageable with said brake member brake surfaces in said outer positions of said brake members; and means for biasing said brake members in said inner positions and preventing outward movement of said brake members below a predetermined speed of said shaft, said biasing means including a guide flange having a hub portion connected to said shaft for rotation therewith and a keeper plate defining a portion of said chamber;

a guide pin associated with each brake member and extending radially outwardly from said hub into a passage in said associated brake member;

a compression spring in said passage and receiving said pin and means connected to said pin and engageable with one end of said spring for pre-compressing said spring and urging said associated brake member in said inner position.

2. A backspin retarder assembly as defined in claim 1, further including means drivingly connecting each said brake member and said flange.

3. A backspin retarder assembly as defined in claim 2, said drivingly connecting means including opposed slots in said brake members and said flange and a key disposed in said slots.

4. A backspin retarder assembly as defined in claim 1, said means defining said backspin chamber comprising:

said guide flange drivingly connected to said drive shaft and each said brake member;

said keeper plate secured to said guide flange for rotation therewith and defining a space therebetween for receiving said brake members; and a circumferential seating plate surrounding said brake members.

5. A backspin retarder assembly as defined in claim 4, said seating plate defining said stationary brake surfaces.

6. A backspin retarder assembly as defined in claim 1, said brake surfaces being tapered.

7. A drive head for use in a progressing cavity pump installation, comprising:

a housing defining a sealed fluid chamber;

a tubular drive shaft extending through and mounted in said housing for rotation therein;

a backspin retarder mounted on said shaft within said chamber, said backspin retarder having:

a plurality of centrifugally actuated brake members;

means for locating said brake members in said chamber in equally, circumferentially spaced relation about said shaft, said members being radially movable between inner and outer positions, each said brake member having tapered brake surfaces on axially opposite sides thereof; said means for locating said brake members including:

a guide member having an annular flange drivingly connected to each said brake member and a hub portion extending axially from said flange and drivingly connected to said drive for rotation therewith; and a keeper plate secured to said hub for rotation therewith; said keeper plate and said flange defining a space therebetween for receiving said brake members and permitting movement of said brake members between said inner and outer positions;

means for biasing each said brake members towards their respective inner positions and preventing movement of said brake members from said inner position toward said outer positions below a predetermined shaft speed; and means defining stationary tapered brake surfaces in said housing and engageable with said brake member brake surfaces in said outer positions of said brake members.

8. A drive head as defined in claim 7, said biasing means including:

a guide pin associated with each brake member, each said pin having one end removably secured to said hub, said pin extending radially outwardly from said hub into a passage in said associated brake member;

a compression coil spring in said passage and receiving said pin; and adjustable means connected to the end of said pin remote from said hub and engageable with one end of said spring for pre-compressing said spring and urging said associated brake member toward said inner position.

9. A drive head as defined in claim 8, each said flange and said keeper plate having an axial fluid flow passage associated with each said brake members, said flow passages being closed by associated brake members when said brake members are located in said inner positions and being opened when said brake members are located in outer positions to permit fluid flow into the space between said flange and keeper plate for cooling and lubricating said brake surfaces.

10. A drive head as defined in claim 9, further including means drivingly connecting each said brake member and said flange.

11. A drive head as defined in claim 7, said retarder defining a fluid flow path from one portion of said oil chamber to another portion thereof and said brake members being in said fluid flow path, said flow path being opened when said brake members are located in said outer positions to permit fluid flow into the space containing said brake surfaces for cooling and lubricating said brake surfaces.

12. A drive head as defined in claim 7, wherein said stationary tapered brake surfaces comprise a seating plate.

* * * * *